(12) United States Patent
Xie et al.

(10) Patent No.: US 8,208,629 B2
(45) Date of Patent: Jun. 26, 2012

(54) VIDEO MONITORING SYSTEM WITH VIDEO SIGNAL ENCRYPTED AND THE METHOD FOR THE SAME

(75) Inventors: Lv Xie, Beijing (CN); Song Qiu, Beijing (CN)

(73) Assignee: Vimicro Corporation, Beijing (CN)

( * ) Notice: Subject to any disclaimer, the term of this patent is extended or adjusted under 35 U.S.C. 154(b) by 1189 days.

(21) Appl. No.: 11/943,313

(22) Filed: Nov. 20, 2007

(65) Prior Publication Data

US 2009/0136030 A1 May 28, 2009

(30) Foreign Application Priority Data

Nov. 21, 2006 (CN) .......................... 2006 1 0145764

(51) Int. Cl.
*G06F 21/00* (2006.01)
(52) U.S. Cl. ........................................ 380/210; 383/250
(58) Field of Classification Search .................. 380/210; 382/250
See application file for complete search history.

(56) References Cited

U.S. PATENT DOCUMENTS

2002/0118886 A1* 8/2002 Hwang et al. ................. 382/250
2003/0112863 A1* 6/2003 Demos ..................... 375/240.01

* cited by examiner

*Primary Examiner* — Vivek Srivastava
*Assistant Examiner* — Thong Truong
(74) *Attorney, Agent, or Firm* — Wuxi Sino IPs Agency, Ltd.; Joe Zheng

(57) ABSTRACT

Techniques pertaining to a security system are disclosed. According to one aspect of the techniques, secured communication of video data between a monitoring system including a monitoring camera and a monitoring terminal is established by encrypting the video data. The monitoring camera is configured to encrypt digital image data before the image data is transmitted to the monitoring terminal. Instead of using commonly used encryption schemes, encryption rules are generated in accordance with an encryption key corresponding to a predetermined encryption algorithm. On the side of the monitoring terminal, decryption rules are generated in accordance with a received description key corresponding to a predetermined decryption algorithm. Depending on implementation, the image data may be encrypted/decrypted line by line, block by block or frame by frame.

10 Claims, 5 Drawing Sheets

VIDEO MONITORING SYSTEM WITH VIDEO SIGNAL ENCRYPTED AND THE METHOD FOR THE SAME

BACKGROUND OF THE INVENTION

1. Field of the Invention

The present invention relates to techniques for security monitoring, and more particularly to video monitoring system with video signal encrypted and the method for doing the same.

2. Description of Related Art

With further development of multimedia technologies, video monitoring systems are widely used in all kinds of areas such as security operations and public security managements. Commonly, a video monitoring system comprises a plurality of monitoring cameras each of which is provided for capturing video data representing a predetermined monitoring area and a monitoring terminal on which the video data can be displayed for supervisors.

FIG. 1 is a schematic block diagram showing a conventional monitoring camera. As shown FIG. 1, the monitoring camera comprises a lens 111, an image sensor 112, an image signal process 113, an image buffer 114, a video encoder 115 and a digital-to-analog (D/A) converter 116.

The lens 111 focuses lights from a scene onto the image sensor 112. The image sensor 112 generates digital image data by converting the light signal from the scene to the analog electronic image signal representing the scene and further converting the analog electronic image signal to the digital image data. The image signal processor 113 adjusts quality of the digital image data received from the image sensor 111, such as auto explosion adjustment, auto white balance adjustment, lightness adjustment or color adjustment. The image buffer 114 may buffer one line of the digital image data or one frame of the digital image data from the image signal processor 113. The video encoder 115 encodes the digital image data received from the image buffer 114 into the digital video data according to a National Television System Committee (NTSC) pattern or a Phase Alternate Line (PAL) pattern and outputs the encoded digital video data to the D/A converter 116. The D/A converter 116 converts the digital video data to the analog video signal and transmits the analog video signal to the monitoring terminal of the monitoring system. As a modification of the monitoring camera, the image signal processor 113 and the image buffer 114 may not be included.

The monitoring terminal of the monitoring system receives the analog video signal from the monitoring camera, converts it to the digital video data and displays the digital video data for the supervisors via a video output unit thereof.

However, during transmission of the video signal, especially by wireless ways, the video signal transmitted from the monitoring camera shown in FIG. 1 has not been encrypted, it may be obtained by other unauthorized video receiver such as normal television besides the authorized monitoring terminal, thereby exposing the monitoring video signal to unauthorized uses.

Thus, there is a need for techniques for encrypting the video signal in the monitoring system.

SUMMARY OF THE INVENTION

This section is for the purpose of summarizing some aspects of the present invention and to briefly introduce some preferred embodiments. Simplifications or omissions in this section as well as in the abstract or the title of this description may be made to avoid obscuring the purpose of this section, the abstract and the title. Such simplifications or omissions are not intended to limit the scope of the present invention.

In general, the present invention pertains to secured communication of video data between a monitoring system including a monitoring camera and a monitoring terminal including a display. According to one aspect of the present invention, the monitoring camera is configured to encrypt digital image data before the image data is transmitted to the monitoring terminal. Instead of using commonly used encryption schemes, encryption rules are generated in accordance with an encryption key corresponding to a predetermined encryption algorithm. On the side of the monitoring terminal, decryption rules are generated in accordance with a received description key corresponding to a predetermined decryption algorithm. Depending on implementation, the image data may be encrypted or decrypted line by line, block by block or frame by frame.

According to another aspect of the present invention, the decrypted image data is encoded. The encoded image data can only be accessed by authorized personnel.

The present invention may be implemented in a system, a method, and an apparatus. According to one embodiment, the present invention is a video monitoring system that comprises: a monitoring terminal for displaying the encrypted digital image data received from the monitoring camera, the monitoring terminal comprising a decryption unit for decrypting the encrypted digital image data by dividing the encrypted digital image data into a plurality of image data blocks being identical with the image data blocks divided in the monitoring camera and replacing the image data blocks to produce decrypted digital image data.

According to another embodiment, the present invention is a video monitoring method comprising: capturing digital image data representing a scene; encrypting the digital image data by dividing one line of the digital image data into a plurality of image data blocks depending on an encryption key and rearranging the image data blocks into one line of the encrypted digital image data according to a given sequence; and decrypting the encrypted digital image data by dividing one line of the encryption digital image data into a plurality of image data blocks being identical with corresponding image data blocks divided in process of encrypting the digital image depending on a decryption key and replacing the image data blocks into one line of the decrypted digital image data according a sequence reversed with the given sequence.

Objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE INVENTION

The detailed description of the present invention is presented largely in terms of procedures, steps, logic blocks, processing, or other symbolic representations that directly or indirectly resemble the operations of devices or systems contemplated in the present invention. These descriptions and representations are typically used by those skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams or the use of sequence numbers representing one or more embodiments of the invention do not inherently indicate any particular order nor imply any limitations in the invention.

Embodiments of the present invention are discussed herein with reference to FIGS. 2-7. However, those skilled in the art will readily appreciate that the detailed description given herein with respect to these figures is for explanatory purposes only as the invention extends beyond these limited embodiments.

In general, video signals in a monitoring camera according to the present invention is encrypted by dividing original image data into a plurality of image data blocks and rearranging the image data blocks according to an encryption rule, and the encrypted video signal in a monitoring terminal according to the present invention is decrypted by dividing the encryption image data into a plurality of image data blocks being identical with corresponding image data blocks divided in the monitoring camera and replacing the image data blocks according to a decryption rule reversed to the encryption rule. Thus, the video signal is protected from being leaked to other receivers during signal transmission.

A video monitoring system is provided for security supervision according to one embodiment of the present invention. The video monitoring system comprises at least a monitoring camera 200 for capturing video data representing a predetermined monitoring area and a monitoring terminal 300 for displaying the video data for supervisors. The monitoring camera 200 and the monitoring terminal 300 will specifically be described in turn below.

Figure 1:
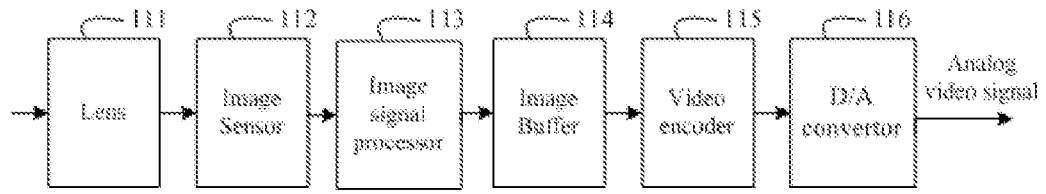
FIG. 1 is a schematic block diagram showing a conventional monitoring camera.
Figure 2:
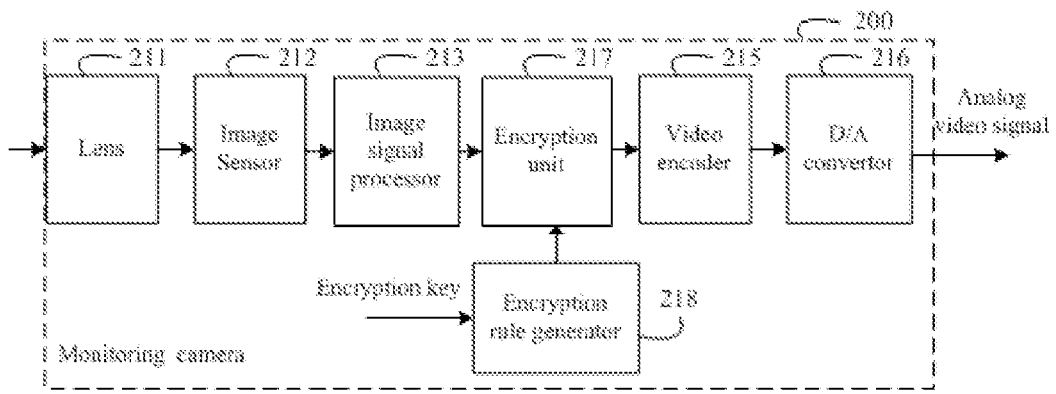
FIG. 2 is a schematic block diagram showing a monitoring camera of a monitoring system according to one embodiment of the present invention.

FIG. 2 is a schematic block diagram showing a monitoring camera 200 in a video monitoring system according to one embodiment of the present invention. In FIG. 2, the monitoring camera 200 comprises a lens 211, an image sensor 212, an image signal processor 213, an encryption unit 217, an encryption rule generator 218, a video encoder 215 and a digital-to-analog (D/A) converter 216.

The lens 211 focuses lights from a scene onto the image sensor 212. The image sensor 212 generates digital image data by converting the light signal from the scene to the analog electronic image signal representing the scene and further converting the analog electronic image signal to the digital image data. The image signal processor 213 adjusts quality of the digital image data from the image sensor 111. The encryption rule generator 218 is configured to generate an encryption rule (to be described later in this specification) according to a received encryption key and a predetermined encryption algorithm. The encryption unit 217 encrypts the digital image data from the image signal processor 213 by dividing the original digital image data into a plurality of image data blocks and rearranging the image data blocks according to an encryption rule from an encryption rule generator 218. The digital image data may be encrypted by lines or frames. Namely, one line of the digital image data may be encrypted by the encryption unit 217 at a time or one frame of digital image data may be encrypted by the encryption unit 217 at a time. The encrypted digital image data is forwarded to the video encoder 215. The video encoder 215 encodes the received digital image data into the digital video data according to a video standard (e.g., NTSC pattern or PAL) and outputs the encoded digital video data to the D/A converter 216. The D/A converter 216 converts the encoded digital video data to analog video signal and outputs the analog video signal to the monitoring terminal 300 of the monitoring system.

Figure 3:
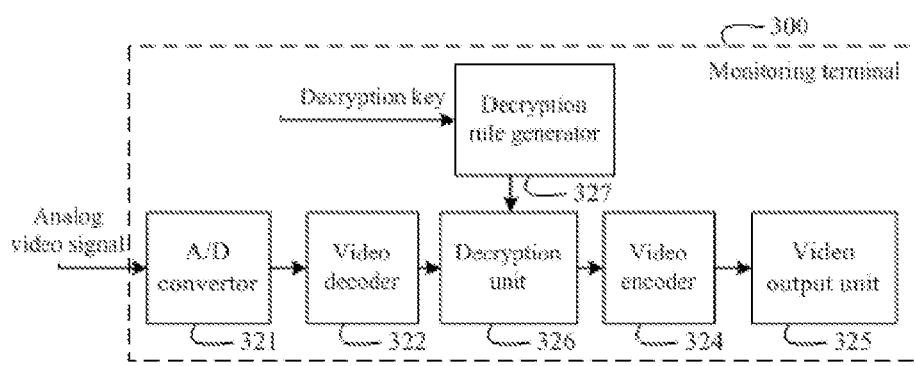
FIG. 3 is a schematic block diagram showing a monitoring terminal of the monitoring system according to one embodiment of the present invention.

FIG. 3 is a schematic block diagram showing the monitoring terminal 300 of the video monitoring system according to one embodiment of the present invention. In FIG. 3, the monitoring terminal 300 comprises an analog-to-digital (A/D) converter 321, a video decoder 322, a decryption unit 326, a decryption rule generator 327, a video encoder 324 and a video output unit 325.

The A/D converter 321 receives the analog video signal from the monitoring camera 200 and converts the analog video signal to the digital video data. The video decoder 322 decodes the digital video data from the A/D converter 321 into the digital image data and outputs the decoded digital image data to a decryption unit 326. The decryption rule generator 327 generates a decryption rule reversed to the encryption rule according to a received decryption key and a predetermined decryption algorithm. The decryption unit 326 decrypts the encrypted digital image data in a manner reversed to the encryption unit 217 by dividing the encryption image data into a plurality of image data blocks being identical with corresponding image data blocks divided in the monitoring camera 200 and replacing the image data blocks according to the decryption rule from the decryption rule generator 327. Accordingly, the encrypted digital image data may be decrypted by lines or frames. Namely, one line of digital image data may be decrypted by the decryption unit 326 at a time or one frame of digital image data may be decrypted by the decryption unit 326 at a time. The video encoder 324 encodes the digital image data from the decryption unit 326 into the digital video data according to a predefined video standard (e.g., NTSC or PAL) and outputs the encoded digital video data to the video output unit 325 such as a display unit. The video output unit 325 displays the received video data for the supervisors.

Either of the monitoring camera 200 and the monitoring terminal 300 may further include an image buffer for buffering a line of digital image data or a frame of digital image data. The decryption unit 326 may further restore the decrypted image data such as U, V components thereof according to a predetermined restoring rule.

Figure 4:
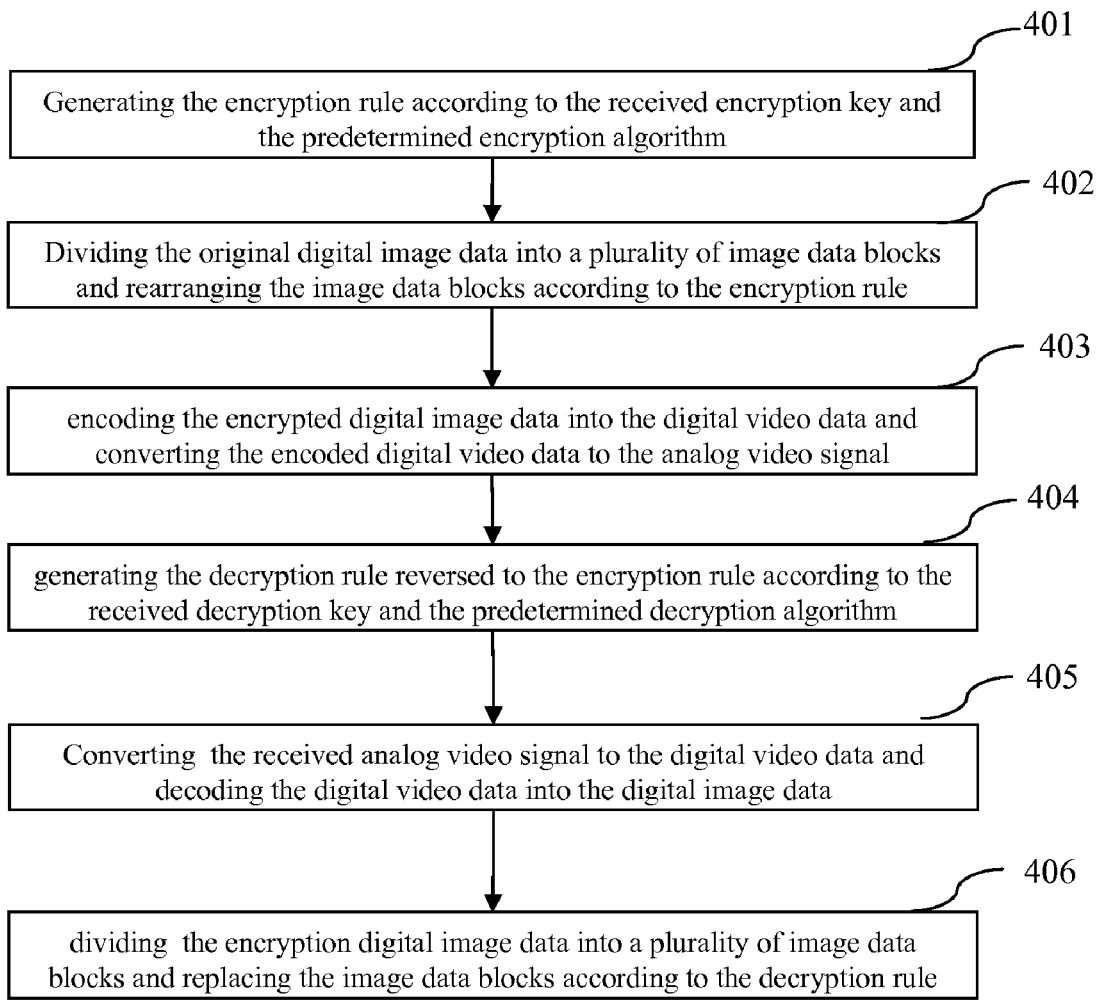
FIG. 4 is a schematic flowchart showing a video monitoring method according to one embodiment of the present invention.

FIG. 4 shows a schematic flowchart of a video monitoring method according to one embodiment of the present invention. In FIG. 4, the video monitoring method comprises processes followed hereafter.

At 401, the monitoring camera generates an encryption rule according to a received encryption key and a predetermined encryption algorithm. At 402, the monitoring camera is configured to divide the original digital image data into a plurality of image data blocks and rearranges the image data blocks according to the encryption rule, thereby the digital image data is encrypted.

At 403, the monitoring camera is configured to encode the encrypted digital image data into the digital video data according to the NTSC/PAL pattern and converts the encoded digital video data to an analog video signal. The analog video signal is transmitted from the monitoring camera to a monitoring terminal. At 404, the monitoring terminal generates a decryption rule reversed to the encryption rule according to the received decryption key and a predetermined decryption algorithm. At 405, the monitoring terminal converts the received analog video signal to the digital video data and decodes the digital video data into the digital image data according to the NTSC/PAL pattern.

At 406, the monitoring terminal is configured to divide the encryption digital image data into a plurality of image data blocks being identical to corresponding image data blocks divided in the monitoring camera and replaces the image data blocks according to the decryption rule in a manner reversed to the monitoring camera, thereby the encryption digital image data is decrypted. Subsequently, the decrypted image data is encoded into the video data.

Supervisors may watch the encoded video data on a display unit of the monitoring terminal 300, thus the video monitoring may be implemented with the higher security.

The process 404 may not be performed after the process 403. As a modification, the process 404 can be performed at any time before the process 405. In addition, before encrypting the digital image data in the process 402, other image processing process may be performed first.

Figure 5:
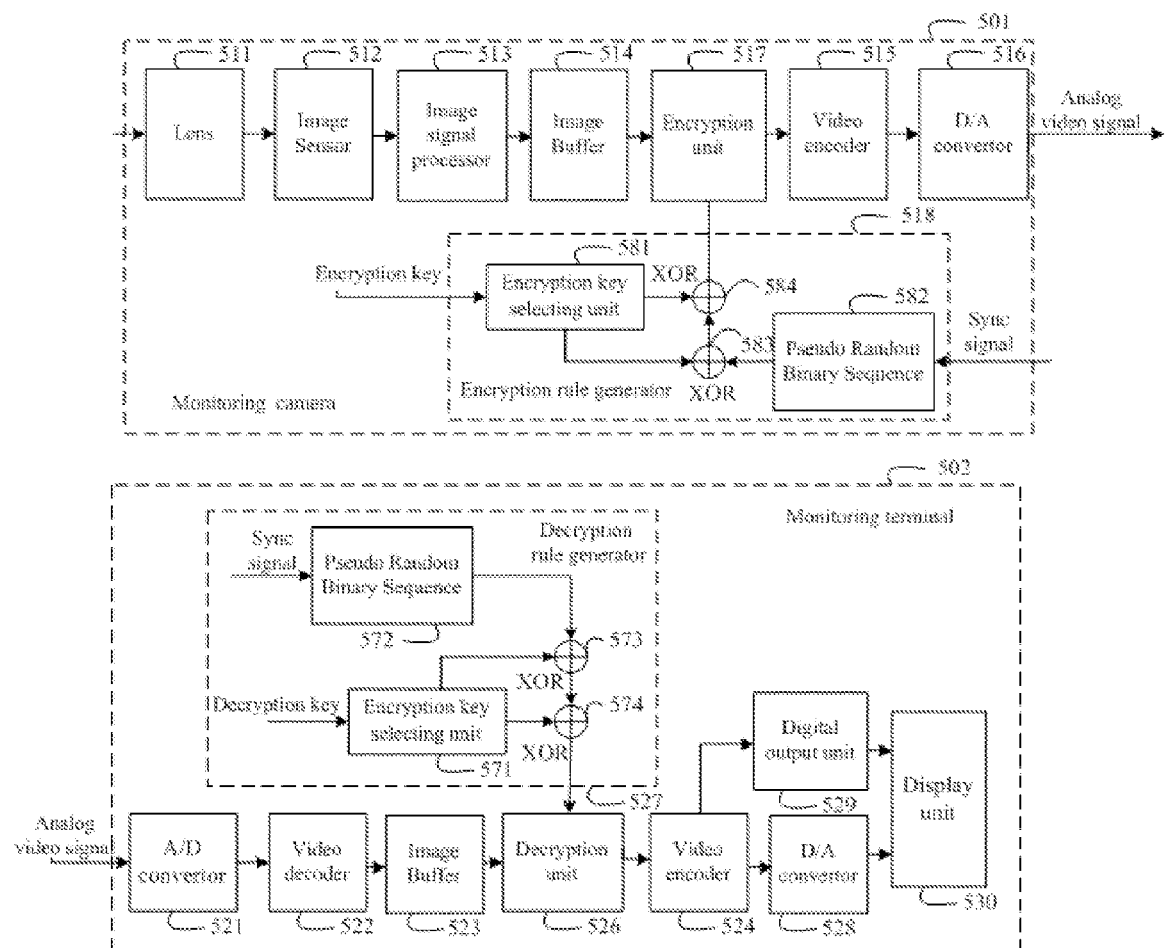
FIG. 5 is a schematic block diagram illustrating the video monitoring system according to another embodiment of the present invention.

FIG. 5 is a schematic block diagram illustrating the video monitoring system according to another embodiment of the present invention. In FIG. 5, the video monitoring system comprises a monitoring camera 501 and a monitoring terminal 502. The monitoring camera 501 shown in FIG. 5 comprises a lens 511, an image sensor 512, an image signal processor 513, an image buffer 514, an encryption unit 517, an encryption rule generator 518, a video encoder 515 and a digital-to-analog (D/A) converter 516.

The lens 511 focuses lights from a scene onto the image sensor 512. The image sensor 512 generates digital image data by converting the light signal from the scene to analog electronic image signal and further converting the analog electronic image signal to the digital image data. The image signal processor 513 adjusts quality of the digital image data from the image sensor 111, such as auto explosion adjustment, auto white balance adjustment, lightness adjustment or color adjustment. The image buffer 514 buffers one line of digital image data or one frame of digital image data from the image signal processor 513 for the encryption unit 517. The encryption rule generator 518 generates an encryption rule according to a received encryption key and a predetermined encryption algorithm. The encryption unit 517 encrypts the digital image data from the image buffer 514 by dividing the original digital image data into a plurality of image data blocks and rearranging the image data blocks according to the encryption rule from the encryption rule generator 518. The digital image data may be encrypted either by lines or frames. Namely, one line of digital image data may be encrypted by the encryption unit 517 at a time or one frame of digital image data may be encrypted by the encryption unit 517 at a time. The encrypted digital image data is forwarded to the video encoder 515. The video encoder 515 encodes the received digital image data into digital video data according to the NTSC/PAL pattern and outputs the encoded video data to the D/A converter 516. The D/A converter 516 converts the encoded video data to analog video signal and outputs the analog video signal to the monitoring terminal 502 of the monitoring system shown in FIG. 5.

Specifically, the encryption rule generator 518 comprises an encryption key selecting unit 581, a pseudo random binary sequence (PRBS) 582, a pair of exclusive or (XOR) gates 583 and 584. The predetermined encryption algorithm is implemented by these units of the encryption rule generator 518.

In one embodiment, the encryption key includes a plurality of 8-bit integer data in the binary system. The more the number of the 8-bit integer data is, the higher the security of the video monitoring system becomes. The encryption key selecting unit 581 determines a piece of key control data, outputs the key control data to an input of the OXR gate 583, selects an 8-bit integer data from the encryption key according to the key control data as a current used encryption key and outputs the current used encryption key to one input of the OXR gate 584. It should be noted that the control data also is 8-bit integer data in the binary system and the value of the control data is variable according to configuration. For example, it is provided that the key control data is 5 in the decimal system and the encryption key has eight 8-bit integer data such as 68948888 in the decimal system, so the encryption key selecting unit 581 selects the 5th integer data 8 from the encryption key 68948888 and outputs the integer data 8 to one input of the OXR gate 584 as the current encryption key. In practice, the key control data may be made an MOD operation before being used in the encryption key selecting unit 581.

The PRBS 582 continuously generates random binary numerals (RBNs) such as 8-bit random integer data under the control of a sync signal and outputs the RBNs to the other input of the OXR gate 583. The sync signal keeps every functional unit of the video monitoring system working synchronously.

Figure 6:
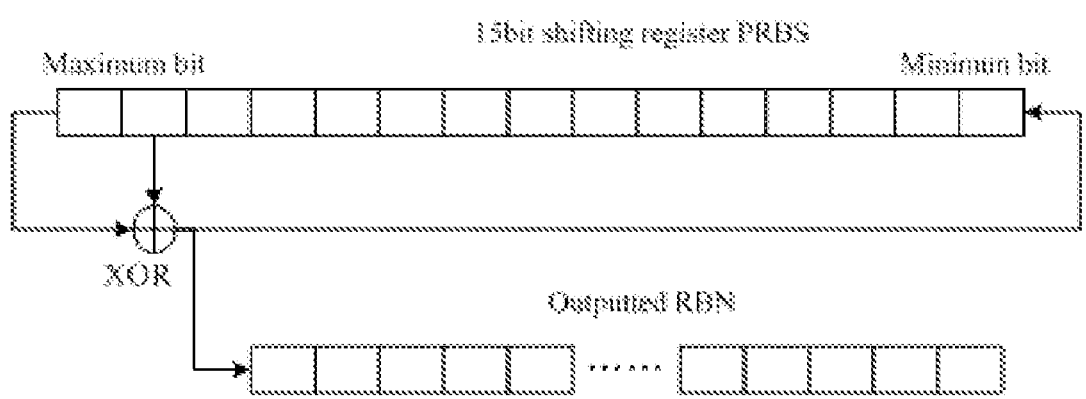
FIG. 6 shows a schematic exemplary configuration of a pseudo random binary sequence of the video monitoring system according to another embodiment of the present invention.

FIG. 6 is a schematic exemplary configuration of the PRBS 582. In FIG. 6, a 15-bit shifting register works as the PRBS 582 and generates the RBNs according to the principle to be described as following. First, a 15-bit shifting register is initialized under the control of the sync signal of the video monitoring system. Specifically, once a pulse of the sync signal is received, the 15-bit shifting register is initialized with a predetermined initial value such as a predetermined 15-bit binary sequence. Secondly, in one period of the sync signal, the maximum two bits of the 15-bit shifting register are made an XOR operation with each other, the 15-bit shifting register shifts left with one bit and the result of the XOR operation is saved into the minimum bit of the 15-bit shifting register. Simultaneously, the result of the XOR operation is outputted as one binary digit of the outputted RBN. Thirdly, in the next period of the sync signal, the next binary digit of the outputted RBN is generated by the same way. Repeating above operations, one 8-bit RBN is generated. The RBN from the PRBS is a random numeral from 0 to 255. Finally, the RBN is outputted to the other input of the OXR gate 583.

For further enhancing the security of the encryption in the video monitoring system, N different predetermined initial values are stored into the PRBS 582 for N fields of the digital image data, thus each field of the digital image data corresponds to one specific predetermined initial value for the PRBS 582 in the N fields, and the N predetermined initial values are circularly used once every N fields of the digital image data. Some special symbols such as white background may be marked on the top of the first field of the repeated fields for field sync, and some special symbols such as black back ground may be marked on the top of the other field of the repeated fields for field sync.

The XOR gate 583 makes an XOR operation to the key control data from the encryption key selecting unit 581 and the RBN from the PRBS 582 and outputs the result of the XOR operation to the other input of the XOR gate 584.

The XOR gate 584 makes an OXR operation to the current used encryption key from the encryption key selecting unit 581 and the operation result of the XOR gate 583 to obtain an encrypted dividing point and outputs the encrypted dividing point to the encryption unit 517 as the encryption rule. The dividing point is a reference for the encryption unit 517 to divide each line of the digital image data. Hence, the value of the dividing point requires to be less than total number of pixels in one line of image data. If the value of the dividing point is larger than the total number of the pixels in one line of image data, some techniques which ordinary people in the art know may be applied to the dividing point for ensuring the value of the dividing point less than the total number of the pixels in one line of image data. For example, provided that the total number of the pixels in one line of image data is 160 and the value of the dividing point is 180, the dividing point may be processed according to following formula: the dividing point=160*180/256, thereby ensuring the value of the dividing point less than the total number of the pixels in one line of image data.

In practice, since one line of the image data may be divided into a plurality of data blocks, the encryption rule generator 518 is configured to generate a corresponding number of dividing points for one line of the image data. in another words, the number of the dividing points required to be generated from the encryption rule generator 518 for one line of image data can be determined according to the number of the image data blocks which one line of image data is divided into. For example, if one line of the digital image data requires to be divided into three image data blocks, so two dividing points require to be generated; if one line of the digital image data requires to be divided into four image data blocks, so three dividing points require to be generated. The dividing points corresponding to one line of image data are called as one group.

The encryption unit 517 divides one line of the original image data into the image data blocks according to a group of dividing points and rearranges the data blocks into one line of the encrypted image data according to a given sequence, thereby one line of the image data is encrypted. By same ways, the encryption unit 517 encrypts every line of the image data. The given sequence may be stored in the encryption rule generator 518 and be outputted to the encryption unit 517 along with the dividing points as the encryption rule. Here taking a simple example, provided that the total number of each line of the image data is 256, the number of the divided data blocks in each line is 4, and the group of the dividing points generated by the encryption rule generator 518 is 100, 50 and 200. Thus, the first data block is the pixels from 1 to 50, the second data block is the pixels from 51 to 100, the third data block is the pixels from 101 to 200, and the fourth data block is the pixels from 201 to 256. After rearranging by the encryption unit 517, the pixels from 51 to 100 is taken as the first data block, the pixels from 1 to 50 is taken as the second data block, the pixels from 101 to 200 is taken as the third data block, and the pixels from 201 to 256 is taken as the fourth data block.

The monitoring terminal 502 shown in FIG. 5 comprises an analog-to-digital (A/D) converter 521, a video decoder 522, an image buffer 523, a decryption unit 526, a decryption rule generator 527, a video encoder 524, a D/A converter 528, a digital output unit 529 and a display unit 530.

The A/D converter 521 receives the analog video signal from the monitoring camera 501 and converts the analog video signal to the digital video data. The video decoder 522 decodes the digital video data from the A/D converter 521 into the digital image data according to the NTSC/PAL pattern and outputs the decoded digital image data to the image buffer 523. The image buffer 523 buffers a line of the digital image data or a frame of the digital image data for the decryption unit 526. The decryption rule generator 527 generates a decryption rule reversed to the encryption rule according to a received decryption key and a predetermined decryption algorithm. The decryption unit 526 decrypts the encrypted digital image data in a manner reversed to the encryption unit 517 by dividing the encryption image data into a plurality of image data blocks being identical with corresponding image data blocks divided in the monitoring camera 501 and replacing the image data blocks according to the decryption rule from the decryption rule generator 527. Because U, V components are filtered in lines during separating U, V component in the NTSC/PAL video encoding, the decryption unit 526 is configured further for restoring U, V components of the decrypted image data. In addition, because that the sampling clocks of the monitoring camera and the monitoring terminal not being completely synchronous may cause sampling points to be offset, and the value of the join pixels of adjacent image data blocks may be distorted due to the influence of the low pass filtering in the monitoring camera and the monitoring terminal, the decryption unit 526 is configured still further for correcting the value of the join pixels of adjacent image data blocks in each line of the digital image data.

The decryption unit 526 may be configured to utilize different ways in prior art to restore the U, V components of the decrypted image data, for example, by using a perpendicularly low pass filter to filter the decrypted image data to eliminate the high frequency signal represented as the color strip phenomena in the decrypted image data.

The video encoder 524 encodes the decrypted digital image data from the decryption unit 526 into the digital video data according to the NTSC/PAL pattern and outputs the encoded video data to the D/A converter 528 or/and the digital output unit 529.

The D/A converter 528 converts the digital video data to the analog video signal and output the analog video signal to the display unit 530. The digital output unit 529 may be a conventional CCIR601/656 digital output module. The digital video data is outputted to the display unit 530 via the digital output unit 529.

The display unit 530 may include one or more analog display or digital display. The display unit 530 receives the analog video signal or the digital video data and displays them for the supervisor.

In one embodiment, the decryption rule generator 527 of the monitoring terminal 502 comprises a decryption key selecting unit 571, a pseudo random binary sequence (PRBS) 572, an XOR gate 573 and an OXR gate 574. The predetermined decryption algorithm is implemented by these units of the decryption rule generator 527.

In one embodiment, the decryption key includes a plurality of 8-bit integer data in the binary system. The decryption key selecting unit 571 determines a key control data being identical with the key control data in the encryption rule generator 518, outputs the key control data to one input of the OXR gate 573, selects an 8-bit integer data from the decryption key according to the key control data as a current used decryption key and outputs the current used decryption key to one input of the OXR gate 574. In practice, if the key control data is made a mod operation before being used in the encryption key selecting unit 581, the key control data also requires to be made a MOD operation before being used in the decryption key selecting unit 571.

Referring to FIG. 6, the PRBS 572 is substantially same with the PRBS 582 in configuration. Likewise, the 15-bit shifting register serving as the PRBS 572 is firstly initialized under the control of the sync signal of the video monitoring system. Namely, once a pulse of the sync signal is received, the 15-bit shifting register is configured with a predetermined initial value such as predetermined 15-bit binary sequence. The predetermined initial value of the PRBS 572 is same with the predetermined initial value of the PRBS 582. In addition, the sync signal received by the PRBS 572 may be transmitted from the video monitoring camera 501 together with the encrypted video signal to the monitoring terminal 502, or may be independently transmitted from the video monitoring camera 501 to the monitoring terminal 502. Thus, the outputted RBN from the PRBS 572 is completely identical with the outputted RBN from the PRBS 582. The RBN of the PRBS 572 is outputted to the one input of the XOR gate 573.

For further enhancing the security of the encryption in the video monitoring system, if the PRBS 582 stores N different predetermined initial values for N fields of the digital image data, the PRBS 582 also stores N different predetermined initial values for N fields of the digital image data, thus the N predetermined initial values are circularly used once every N fields of the digital image data. It should be noted that the N predetermined initial values in the PRBS 582 are same with the N predetermined initial values in the PRBS 572.

The XOR gate 573 makes an XOR operation to the key control data from the decryption key selecting unit 571 and the RBN from the PRBS 572 and outputs the result of the XOR operation to the other input of the XOR gate 574.

The XOR gate 574 makes an OXR operation to the current used decryption key from the decryption key selecting unit 571 and the operation result of the XOR gate 573 to obtain a decrypted dividing point and output the decrypted dividing point to the decryption unit 526 as the decryption rule.

In one embodiment, the decryption key may be similar to the encryption key, thereby the decrypted dividing point generated by the decryption rule generator 527 is identical with the encrypted dividing point generated by the encryption rule generator 518. The decryption unit 526 decrypts each line of the image data according to the decrypted dividing point in a manner completely reversed with the encryption unit 517.

For an example, provided that the encrypted dividing point corresponding to one line of the image data received by the encryption unit 517 is 20. So, the one line of the image data is divided into two data blocks at the 20$^{th}$ pixel counted from the left, namely the 20 pixels of the one line of the image data counted from the left are taken as one data block and the residual pixels are taken as the other data block. Then, the encryption unit 517 rearranges the two data blocks to encrypt the one line of the image data by exchanging the position of the two data blocks. Accordingly, the encryption unit 517 can encrypt every line of the image data by the same operation, thereby encrypting the image data. Correspondingly, the decrypted dividing point corresponding to the one line of the encrypted image data received by the decryption unit 526 also is 20. So, the one line of the encrypted image data is divided into two data blocks at the 20$^{th}$ pixel counted from the right, namely the 20 pixels of the one line of the image data counted from the right are taken as one data block and the residual pixels are taken as the other data block. Then, the decryption unit 526 replaces the sequence of the two data blocks by exchanging the positions of the two data blocks to decrypt the one line of the encrypted image data. Accordingly, the decryption unit 526 can decrypt every line of the encrypted image data by the same operation, thereby decrypting the image data.

In one embodiment, the decryption key may be different from the encryption key. At this situation, the decryption key is preset for ensuring the encrypted dividing point from the encryption rule generator 518 and the decrypted dividing point from the decryption rule generator 527 satisfy the following relative equation:

encrypted dividing point+decrypted dividing point=number of rows of the image data The decryption unit 526 decrypts each line of the image data according to the decrypted dividing point in a manner to be described hereafter.

For an example, provided that number of rows of the image data is 768, and the encrypted dividing point corresponding to one line of the image data received by the encryption unit 517 is 20. So, the one line of the image data is divided into two data blocks at the 20$^{th}$ pixel counted from the left, namely the 20 pixels of the one line of the image data counted from the left are taken as one data block and the residual 748 pixels are taken as the other data block. Then, the encryption unit 517 rearranges the two data blocks to encrypt the one line of the image data by exchanging the position of the two data blocks. Accordingly, the encryption unit 517 can encrypt every line of the image data by the same operation, thereby encrypting the image data. Correspondingly, the decrypted dividing point corresponding to the one line of the encrypted image data received by the decryption unit 526 is 748. So, the one line of the encrypted image data is divided into two data blocks at the 748$^{th}$ pixel counted from the left, namely the 748 pixels of the one line of the image data counted from the left are taken as one data block and the residual 20 pixels are taken as the other data block. Then, the decryption unit 526 replaces the sequence of the two data blocks by exchanging the positions of the two data blocks to decrypt the one line of the encrypted image data. Accordingly, the decryption unit 526 can decrypt every line of the encrypted image data by the same operation, thereby decrypting the image data.

If other possible division ways or other encryption algorithms are introduced in the video monitoring system, the corresponding relationship of the encrypted dividing point and the decrypted dividing point may be determined accordingly.

As described above, one line of the image data may be divided into a plurality of data blocks and the encryption rule generator 518 may generate a group of encrypted dividing points for one line of the image data as the encryption rule. Correspondingly, the decryption rule generator 527 may also generate a group of decrypted dividing points for one line of the encrypted image data as the decryption rule, and the decryption unit 526 may also divide one line of the encrypted image data into the image data blocks identical with the image data blocks divided in the encryption unit 517 according to the group of decrypted dividing points and replace the data blocks into one line of the decrypted image data according to a reverse sequence of the given sequence. The reverse sequence may be stored in the decryption rule generator 527 and be outputted to the decryption unit 526 along with the dividing points as the decryption rule.

As a modification, the encryption unit 517, the encryption rule generator 518, the decryption unit 526 and the decryption rule generator 527 may also be implemented according to a conventional encryption algorithm. The D/A converter 528, digital output unit 529 and display unit 530 are equivalent with the video output unit 325 shown in FIG. 3. The XOR gate in FIG. 5 may be replaced by other logical operator such as NXOR gate.

Figure 7:
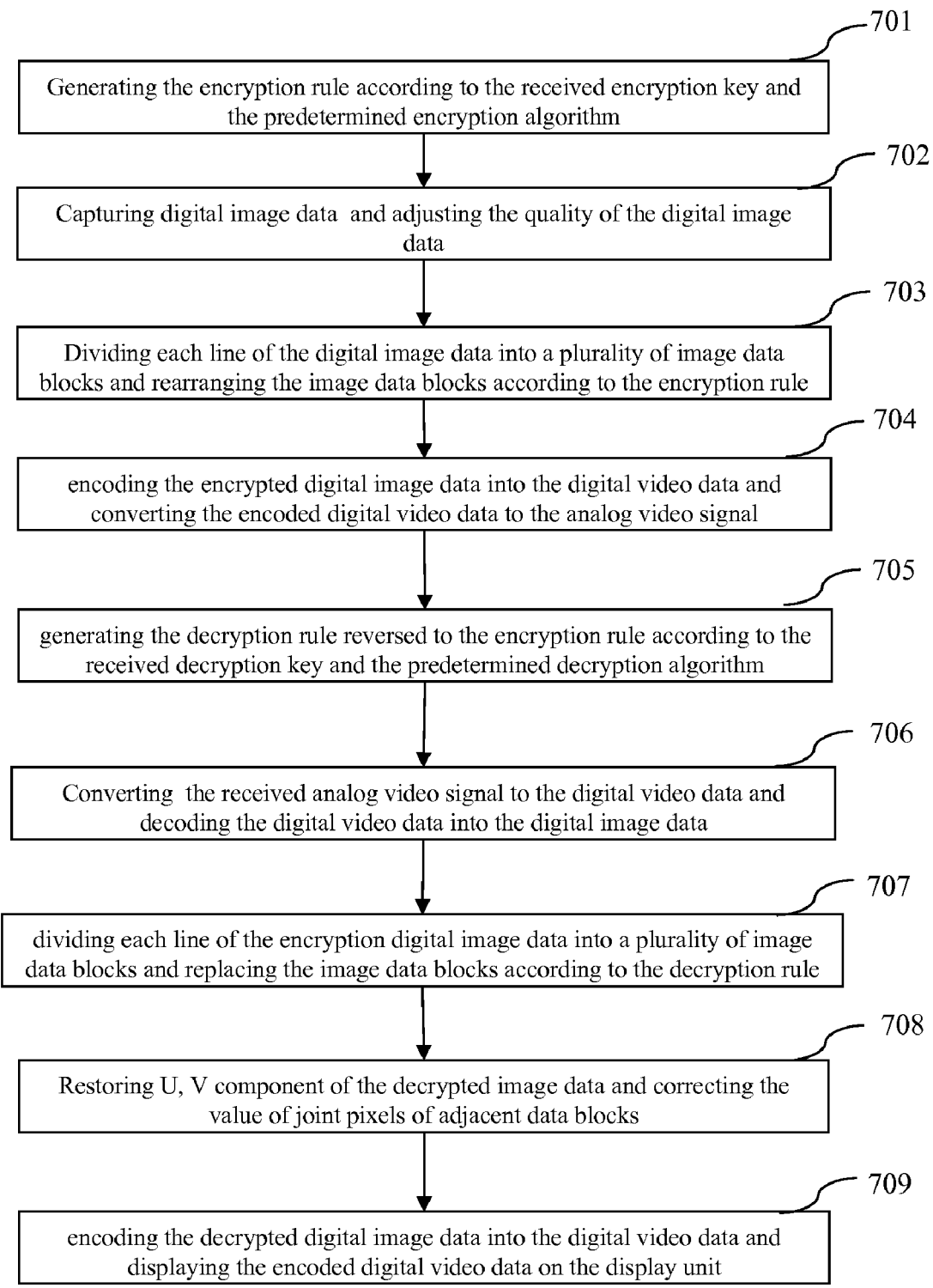
FIG. 7 is a schematic flowchart showing the video monitoring method according to another embodiment of the present invention.

FIG. 7 shows a schematic flowchart of the video monitoring method according to another embodiment of the present invention. In FIG. 7, the video monitoring method comprises processes followed hereafter.

At 701, the monitoring camera generates the encryption rule according to the received encryption key and the predetermined encryption algorithm.

The encryption key includes a plurality of 8-bit integer data in the binary system. The process 701 is specifically performed by: determining the key control data; selecting an 8-bit integer data from the encryption key according to the key control data as a current used encryption key; generating a random binary numeral (RBN) under the control of a sync signal; making an XOR operation to the key control data and the RBN; making an OXR operation to the current used encryption key and the operation result of the key control data and the RBN to obtain an encrypted dividing point; outputting the encrypted dividing point as the encryption rule.

The process of generating the RBN is performed by: initializing a 15-bit shifting register with a predetermined initial value under the control of the sync signal of the video monitoring system; making an XOR operation to the maximum two bits of the 15-bit shifting register; shifting left the 15-bit shifting register with one bit and storing the result of the XOR operation into the minimum bit of the 15-bit shifting register; outputting the result of the XOR operation as one binary digit of the RBN; repeating above operations to generate one 8-bit RBN.

At 702, the monitoring camera captures digital image data and adjusts the quality of the digital image data image data.

At 703, the monitoring camera divides the digital image data into a plurality of image data blocks and rearranges the image data blocks according to the encryption rule. Thus, the digital image data is encrypted.

At 704, the monitoring camera encodes the encrypted digital image data into the digital video data according to the NTSC/PAL pattern and converts the encoded digital video data to the analog video signal. The analog video signal is transmitted from the monitoring camera to the monitoring terminal.

At 705, the monitoring terminal generates the decryption rule reversed to the encryption rule according to the received decryption key and the predetermined decryption algorithm. The process 705 is specific substantially identical with the process 701. So, the decryption dividing points is generated as the decryption rule by the same way with the process 701.

At 706, the monitoring terminal converts the received analog video signal to the digital video data and decodes the digital video data into the digital image data according to the NTSC/PAL pattern.

At 707, the monitoring terminal divides the encryption digital image data into a plurality of image data blocks being identical with corresponding image data blocks divided in the monitoring camera and replaces the image data blocks according to the decryption rule in a manner reversed to the monitoring camera. Thus, the encryption digital image data is decrypted.

At 708, the monitoring terminal restores U, V components of the decrypted image data and corrects the value of join pixels of adjacent image data blocks in one line of the decrypted image data.

At 709, the monitoring terminal encodes the decrypted image data into the digital video data. The digital video data may be outputted on a digital display unit or be outputted on an analog display unit after being converted into the analog video signal. Since the video monitoring system shown in FIG. 5 is described in detail, some specific limitations of the video monitoring method is omitted here for simplicity.

The present invention has been described in sufficient details with a certain degree of particularity. It is understood to those skilled in the art that the present disclosure of embodiments has been made by way of examples only and that numerous changes in the arrangement and combination of parts may be resorted without departing from the spirit and scope of the invention as claimed. Accordingly, the scope of the present invention is defined by the appended claims rather than the foregoing description of embodiments.

What is claimed is:

1. A video monitoring system comprising:
a monitoring camera for capturing digital image data, the monitoring camera including an encryption unit for encrypting the digital image data by dividing the digital image data into a plurality of first image data blocks and rearranging the first image data blocks to produce non-sequential digital image data; and
a monitoring terminal including a decryption unit for decrypting the non-sequential digital image data by dividing the non-sequential digital image data into a plurality of second image data blocks being identical to the first image data blocks divided in the monitoring camera and rearranging the second image data blocks to produce sequential digital image data for display on the monitoring terminal, wherein the digital image data is encrypted by lines, the encryption unit is configured to divide one line in the digital image data into the first image data blocks and rearrange the first image data blocks into one line of the non-sequential digital image data;
correspondingly, the non-sequential digital image data is decrypted by lines too, the decryption unit is configured to divide one line of the non-sequential digital image data to produce the second image data blocks and rearrange the first image data blocks into one line of the sequential digital image data,
wherein the monitoring camera further comprises an encryption rule generator for generating an encryption rule according to an encryption key and a predetermined encryption algorithm, and the monitoring terminal further comprises a decryption rule generator for generating a decryption rule reversed to the encryption rule according to a decryption key and a predetermined encryption algorithm;
wherein the encryption rule generator randomly generates a group of encryption dividing points for each line of the digital image data as the encryption rule depending on the encryption key, and the decryption rule generator randomly generates a group of decryption dividing points for each line of the digital image data as the decryption rule depending on the decryption key, and wherein the encryption unit is configured to divide one line of the digital image data into of the first image data blocks according to the corresponding encryption dividing points; and the decryption unit is configured to divide one line of the non-sequential digital image data into of the second image data blocks according to the corresponding decryption dividing points.

2. The video monitoring system according to claim 1, wherein the encryption rule generator comprises an encryption key selecting unit, a pseudo random binary sequence (PRBS), a first XOR gate and a second XOR gate, and wherein the encryption key selecting unit is configured for receiving the encryption key with a plurality of integer data, selecting one integer data from the encryption key according to a predetermined key control data as a current used encryption key, outputting the current used encryption key to one input of the second XOR gate and outputting the key control data to one input of the first XOR gate;

the PRBS generates is configured for generating random binary numerals (RBNs) and outputting the RBNs to the other input of the first OXR gate;

the first XOR gate is configured for making an XOR operation to the key control data and the RBN and outputting the result of the XOR operation to the other input of the second XOR gate; and the second XOR gate is configured for making an OXR operation to the current used encryption key and the operation result of the first XOR gate to obtain an encrypted dividing point and outputting the encrypted dividing point to the encryption unit as the encryption rule.

3. The video monitoring system according to claim 2, wherein the decryption rule generator comprises an decryption key selecting unit, a pseudo random binary sequence (PRBS), a third XOR gate and a fourth XOR gate, and wherein the decryption key selecting unit is configured for receiving the decryption key with a plurality of integer data, selecting one integer data from the decryption key according to a predetermined key control data being same with the predetermined key control data in the encryption key selecting unit as a current used decryption key, outputting the current used decryption key to one input of the fourth XOR gate and outputting the key control data to one input of the third XOR gate;

the PRBS generates is configured for generating random binary numerals (RBNs) being same with the RBNs generated in the encryption rule generator and outputting the RBNs to the other input of the third OXR gate;

the third XOR gate is configured for making an XOR operation to the key control data and the RBN and outputting the result of the XOR operation to the other input of the fourth XOR gate; and the fourth XOR gate is configured for making an OXR operation to the current used decryption key and the operation result of the third XOR gate to obtain an decrypted dividing point and outputting the decrypted dividing point to the decryption unit as the decryption rule.

4. The video monitoring system according to claim 3, wherein the PRBS in the encryption rule generator or in the decryption rule generator is a shifting register.

5. The video monitoring system according to claim 1, wherein the decryption unit is configured further for restoring U, V components of the non-sequential digital image data.

6. The video monitoring system according to claim 5, wherein the decryption unit is configured further for correcting values of join pixels of adjacent image data blocks.

7. The video monitoring system according to claim 1, wherein the monitoring camera further comprises a lens, an image sensor, an image signal processor, a video encoder and a digital-to-analog (D/A) converter, and the monitoring terminal further comprises an analog-to-digital (A/D) converter, a video decoder, a video encoder and a video output unit, and wherein the video encoder of the monitoring camera is configured to encode the non-sequential digital image data into non-sequential digital video data;

the D/A convertor of the monitoring camera is configured for convert encoded digital video data to an analog video signal and outputting the analog video signal to the monitoring terminal;

the A/D converter of the monitoring terminal is configured to receive the analog video signal from the monitoring camera and convert the analog video signal to digital video data;

the video decoder of the monitoring terminal is configured to decode the digital video data from the ND converter into the digital image data; and the video encoder of the monitoring terminal is configured to encode the digital image data into digital video data and output the encoded digital video data to the video output unit.

8. A video monitoring method comprising:
capturing digital image data representing a scene;
encrypting the digital image data by dividing one line of the digital image data into a plurality of image data blocks depending on an encryption key and rearranging the image data blocks to produce one line of the non-sequential image data blocks;
encoding the non-sequential image data blocks for transmission;
decoding the encoded non-sequential image data blocks; and
decrypting the non-sequential image data blocks by dividing the non-sequential image data blocks into a plurality of second image data blocks being identical with the corresponding first image data blocks and rearranging the second image data blocks to recover sequential image data blocks for display,
wherein said encrypting the digital image data comprises:
generating a group of encryption dividing points depending on the encryption key;
dividing the digital image data into of the first image data blocks according to the encryption dividing points;
rearranging the first image data blocks into the non-sequential digital image data blocks; and
wherein said decrypting the non-sequential image data blocks comprises:
generating a group of decryption dividing points depending on the decryption key;
dividing the non-sequential image data blocks into a plurality of second image data blocks being identical with the corresponding first image data blocks; and
rearranging the second image data blocks to produce the sequential image data blocks.

9. The video monitoring method according to claim 8, wherein said generating a group of encryption dividing points comprises:

generating a random binary sequence;

obtaining a binary encryption key sequence via the encryption key;

making a logical operation to a random binary sequence and the binary encryption key sequence to get one encrypted dividing point; and repeating the above process till a group of encryption dividing points is generated.

10. The video monitoring method according to claim 8, wherein said generating a group of decryption dividing points comprises:

generating a random binary sequence;

obtaining a binary decryption key sequence via the decryption key;

making a logical operation to the random binary sequence and the binary decryption key sequence to get one decrypted dividing point; and repeating the above process till a group of decryption dividing points is generated.

\* \* \* \* \*